(12) United States Patent
Chiku et al.

(10) Patent No.: US 6,646,783 B1
(45) Date of Patent: Nov. 11, 2003

(54) LIGHT MODULATION DEVICE AND FILTER DEVICE

(75) Inventors: Shinichiro Chiku, Kyoto (JP); Takashi Fujii, Otsu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/455,626

(22) Filed: Dec. 7, 1999

(30) Foreign Application Priority Data

Dec. 7, 1998 (JP) ............................................. 10-347164

(51) Int. Cl.[7] ................................................. G02F 1/00
(52) U.S. Cl. ........................................ 359/324; 359/321
(58) Field of Search ................................. 359/324, 280, 359/246, 283, 281

(56) References Cited

U.S. PATENT DOCUMENTS

| | | | | |
|---|---|---|---|---|
| 3,764,195 A | * | 10/1973 | Blank et al. ................. | 385/130 |
| 4,575,179 A | * | 3/1986 | Lee et al. ....................... | 385/6 |
| 4,898,440 A | * | 2/1990 | Tamada et al. .............. | 385/130 |

FOREIGN PATENT DOCUMENTS

| JP | 11258561 | * 11/1999 | ............. G02F/5/05 |
|---|---|---|---|

OTHER PUBLICATIONS

Makoto Tsutsumi et al., "On the Interactions Between Optical Signals and Microwaves in the Yttrium Iron Garnet Single Crystal", Technical Report of IEICE, , Jun. 1998.

A.D. Fisher et al., "Optical Guided–Wave Interactions With Magnetostatic Waves at Microwave Frequencies", Applied Physics Letters, vol. 41, No. 9, Nov. 1, 1982.

C.S. Tsai et al., "Noncollinear Coplanar Magneto–Optic Interaction of Guided Optical Wave and Magnetostatic Surface Waves in Yttrium Iron Garnet–Gadolinium Gallium Garnet Waveguides", Applied Physics Letters, vol. 47, No. 7, Oct. 1, 1985.

* cited by examiner

*Primary Examiner*—Georgia Epps
*Assistant Examiner*—Gary O'Neill
(74) *Attorney, Agent, or Firm*—Ostrolenk, Faber, Gerb & Soffen, LLP

(57) ABSTRACT

A light modulation device comprises: a magnetic garnet single crystal having a main surface and an easy magnetization axis in parallel with the main surface; an optical source arranged such that light emitted from the optical source is introduced into the magnetic garnet single crystal and propagates in the magnetic garnet single crystal along a first direction on the main surface; and one or a pair of transducers provided on the main surface of the magnetic garnet single crystal for applying a microwave signal in a region of the magnetic garnet single crystal where the light from the optical source propagates, to modulate the light.

16 Claims, 5 Drawing Sheets

LIGHT MODULATION DEVICE AND FILTER DEVICE

BACKGROUND OF THE INVENTION

1. Field of the Invention

The present invention relates to a light modulation device and a filter device, and more particularly to a light modulation device and a filter device using a magnetic garnet single crystal.

2. Description of the Related Art

Conventionally, there have been attempts to modulate light using microwaves in a magnetic garnet single crystal such as a YIG crystal (M. Tutumi et al., Technical Report of IEICE MW98-41; C. S. Tsai et al., Appl. Phys. Lett. 47 (7) 651 (1985); A. D. Ficher et al., Appl. Phys. Lett. 41 (9) 779 (1982)). The magnetic garnet single crystal (YIG) used in these light modulation devices has generally been a bulk single crystal or an epitaxial thin-film. In this case, there has been no preferred direction of the magnetic garnet single crystal, but in many cases where an epitaxial thin-film is used, the face direction is selected to be a <111> direction.

In a conventional microwave light modulation device using a magnetic garnet single crystal, greater modulation efficiency can be achieved using a thick bulk single crystal as the magnetic garnet single crystal, rather than by using a thin epitaxial thin-film.

However, although a superior large-scale epitaxial thin-film can be obtained comparatively easily and with few defects using an LPE method, or sputtering, or the like, it is difficult to obtain a bulk single crystal by these methods.

SUMMARY OF THE INVENTION

Accordingly, it is an object of the present invention to provide a light modulation device and a filter device which have high modulation efficiency using either a bulk single crystal or an epitaxial thin-film as the magnetic garnet single crystal.

The light modulation device may comprise: a magnetic garnet single crystal having a main surface and an easy magnetization axis in parallel with the main surface; an optical source arranged such that light emitted from the optical source is introduced into the magnetic garnet single crystal and propagates in the magnetic garnet single crystal along a first direction on the main surface; and one or a pair of transducers provided on the main surface of the magnetic garnet single crystal for carrying a microwave signal in a region of the magnetic garnet single crystal where the light from the optical source propagates, so as to modulate the light.

The magnetic garnet single crystal preferably has a <110> direction or a <211> direction as the main surface. The first direction on the main surface of the magnetic garnet single crystal and the easy magnetization axis are preferably parallel with each other. Moreover, a magnetic field is preferably applied to the magnetic garnet single crystal along the first direction.

The magnetic garnet single crystal may comprise $Y_3Fe_5O_{12}$, or alternatively at least one of the Y and the Fe of the $Y_3Fe_5O_{12}$ may be replaced by another element. The magnetic garnet single crystal may be a bulk single crystal. The magnetic garnet single crystal may also be an epitaxial thin-film, or an epitaxial thin-film made using a liquid phase epitaxial method.

According to another embodiment of the present invention, a filter device comprises: a light modulation device as described herein; and a photodetector for detecting the light propagated in the magnetic garnet single crystal.

According to the present invention, a light modulation device and a filter device can have high modulation efficiency, whether using a bulk single crystal or an epitaxial thin-film as the magnetic garnet single crystal.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

The inventors of the present invention have studied light modulation devices having magnetic garnet single crystal, and found that light modulation efficiency is not necessarily dependent only on the thickness of the magnetic garnet single crystal, and that considerable light modulation efficiency can be achieved even with a thin-film crystal, by utilizing an easy magnetization axis which exists in the magnetic garnet single crystal.

Hereinafter, the preferred embodiments of the present invention are explained in detail with reference to the drawings.

Figure 1:
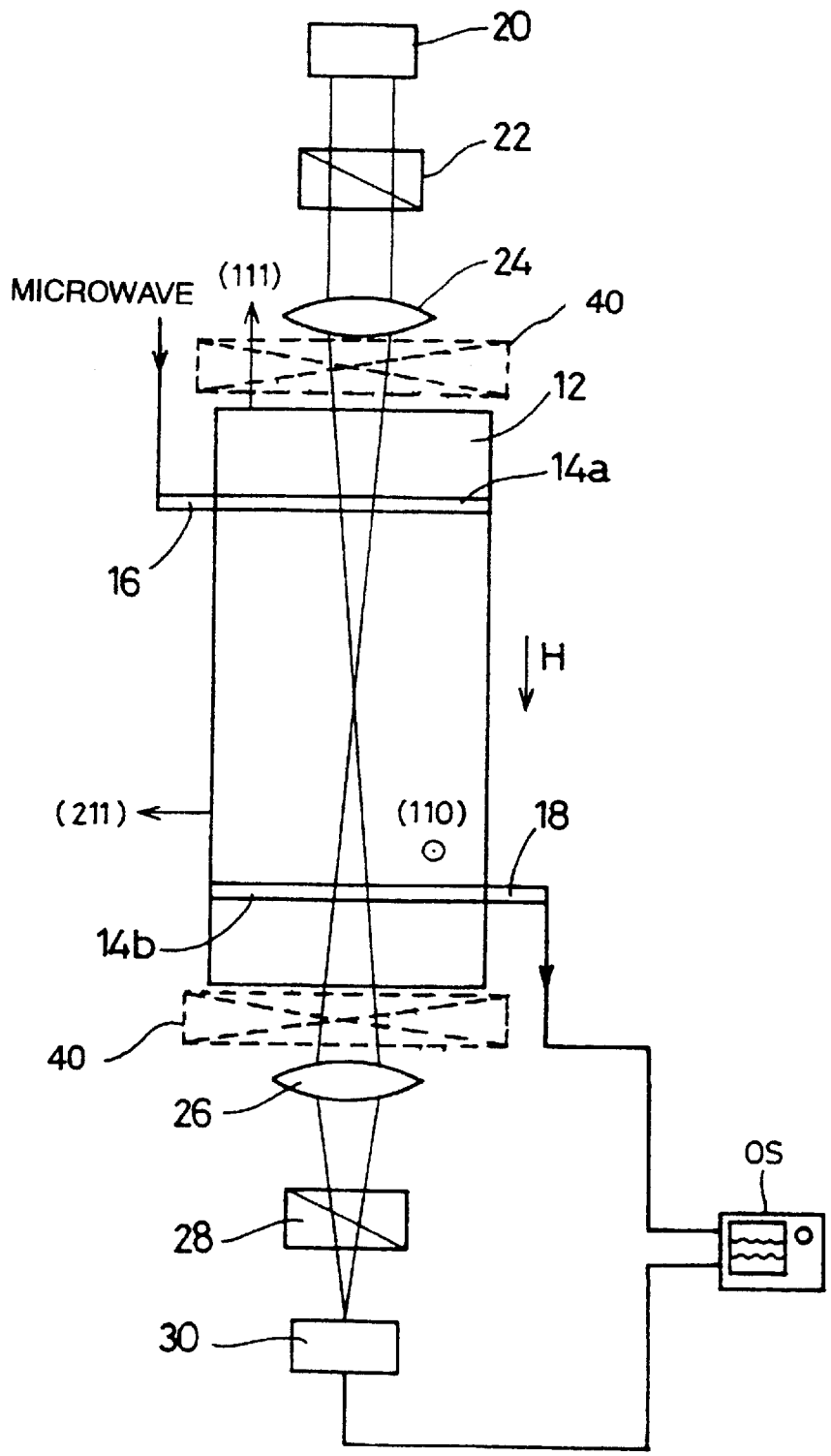
FIG. 1 is a diagrammatic view showing an example of a light modulation device according to an embodiment of this invention.

FIG. 1 is a diagrammatic view of an example of the light modulation device according to the present invention. The light modulation device 10 shown in FIG. 1 comprises a YIG bulk single crystal 12 which is a plate having a <110> face direction. The YIG bulk single crystal 12 has a size of, for instance, 15 mm×10 mm×1 mm. In this case, the 15 mm×10 mm face (the main face) of the YIG bulk single crystal plate 12 is a (110) face, the 15 mm×1 mm face is a (211) face, and the 10 mm×1 mm face is a(111) face.

Note that, although a YIG bulk single crystal is used in the light modulation device 10, a YIG single crystal thin film may also be employed. That is, as long as a YIG single crystal has a main surface having a <110> face direction along which a microwave and light can propagate in the YIG single crystal, the size of the YIG single crystal can be varied in accordance with the intended use of the light modulation device 10.

A first transducer 14a and a second transducer 14b, comprising fine-line antennas having for instance a length of 10 mm, a width of 0.1 mm, and a height of 30 μm, are provided on the (110) face, which is the main face of the YIG bulk single crystal plate 12, with an interval of 10 mm therebetween.

A microwave input terminal 16 and a microwave output terminal 18, comprising for instance coaxial connectors, are provided on opposite sides of the YIG bulk single crystal plate 12 in the direction of its width. The microwave input terminal 16 and the microwave output terminal 18 are connected respectively to an end of the first transducer 14a on one side of the single crystal plate 12, and to an end of the second transducer 14b on the opposite side of the crystal plate 12. The microwave input terminal 16 is for being connected to an output terminal of a microwave generator (not shown in the diagram) for generating microwaves in, for instance, the GHz band. The microwave output terminal 18 is connected to an oscilloscope OS in order to measure the output from the microwave output terminal 18.

A permanent magnet 40 is provided near the YIG bulk single crystal 12. This permanent magnet applies a weak direct magnetic field H to the YIG bulk single crystal 12 in a direction perpendicular to the first transducer 14a and the second transducer 14b. It is preferable that the direction of the weak direct magnetic field is parallel to the <111> direction of the YIG bulk single crystal 12.

A semiconductor laser 20 as an optical source, a polarizer 22, and a first lens 24 are provided in this order near to one end face in the length direction of the YIG bulk single crystal 12. The semiconductor laser 20 generates a laser beam having a wavelength of for instance 1.3 µm. The polarizer 22 directly polarizes the laser beam generated by the semiconductor laser 20 in a specific direction. The first lens 24 focuses the laser beam generated by the semiconductor laser 20 in the YIG bulk single crystal 12.

A second lens 26, an analyzer 28, and a photodetector 30 are provided in this order near to the other end face of the YIG bulk single crystal 12 in the direction of its length, and are separate from the YIG bulk single crystal 12. The second lens 26 focuses the laser beam after it has passed through the YIG bulk single crystal 12. The analyzer 28 passes the linearly polarized light in a specific direction of the laser beam, and has for instance a crossed Nicols relationship to the polarizer 22. The photodetector 30 detects a signal of the laser beam, and comprises for instance an In GaAs photodiode. The output terminal of the photodetector 30 is connected to the oscilloscope OS, in order to measure the output of the photodetector 30. Note that it is preferable that the light propagation direction is parallel to the <111> direction of the YIG bulk single crystal 12.

As a result of these arrangements, the semiconductor laser 20 emits a laser beam, the laser beam is successfully introduced into the YIG bulk single crystal 12 and the laser beam propagates in the YIG bulk single crystal 12 along the <111> direction on the main surface ((110) face) of the YIG bulk single crystal 12. In addition, a region of the YIG bulk single crystal 12 where the laser beam propagates is located between the input terminal 16 and the output terminal 18.

In the light modulation device 10 shown in FIG. 1, when a microwave signal at a frequency in the GHz band is input to the microwave input terminal 16, the microwave is sent from the first transducer 14a into the YIG bulk single crystal 12, through the second transducer 14b, and the output of the microwave from the microwave output terminal 18 is measured. This output is measured by the oscilloscope OS, and the oscilloscope OS is triggered by the output. Furthermore, the laser beam generated by the semiconductor laser 20 is linearly polarized in a specific direction by the polarizer 22, and focused in the YIG bulk single crystal 12 by the first lens 24. After having been focused in the YIG bulk single crystal 12, the laser beam passes through the YIG bulk single crystal 12, is focused by the first lens 26, passes through the analyzer 28, and is detected by the photodetector 30. Then, the oscilloscope OS measures the output from the photodetector 30.

Figure 2:
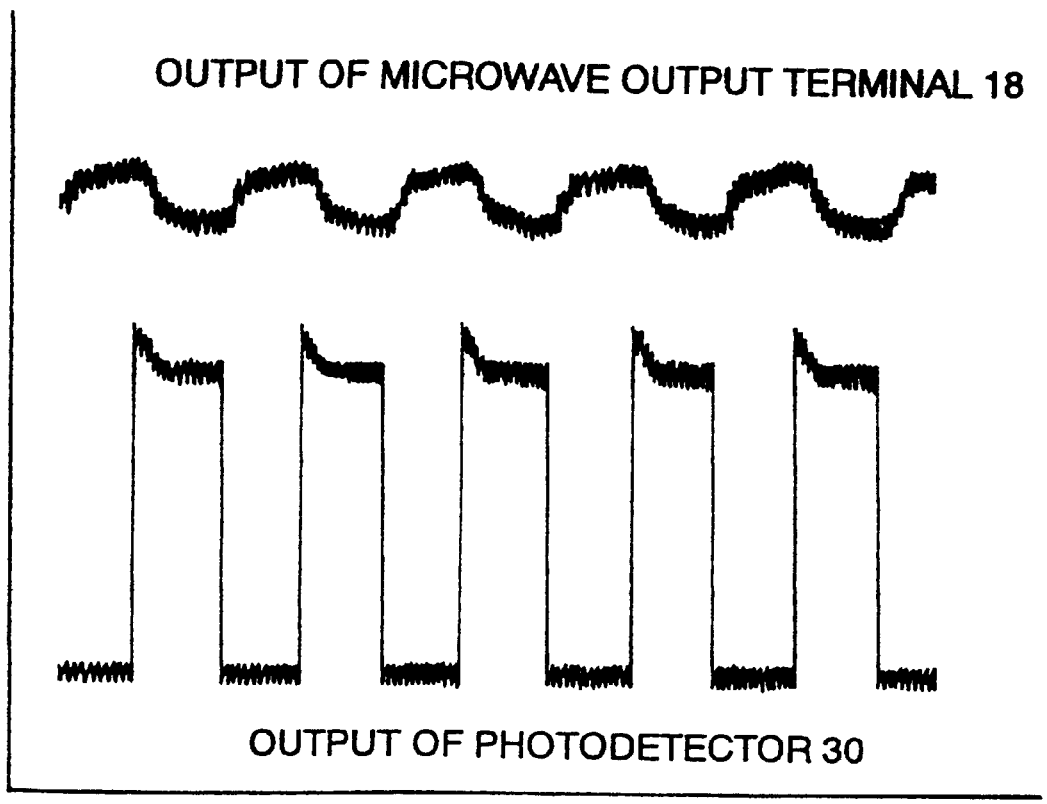
FIG. 2 is a graph showing the outputs of a microwave output terminal and a photodetector in the light modulation device, as measured by an oscilloscope.

FIG. 2 is a graph showing the outputs from the microwave output terminal 18 and the photodetector 30 in the light modulation device 10, as measured by the oscilloscope OS. According to observation at the oscilloscope OS (the graph shown in FIG. 2), a modulation component, comprising a microwave signal in the same phase and at the same frequency as the microwave output via the second transducer 14b from the microwave output terminal 18, is superimposed onto the light passing through the YIG bulk single crystal 12 and detected by the photodetector 30. This modulation component has a strength of approximately several percent of the light output. The reason for the existence of this modulation component is not clear, but the following reasons may be envisaged.

In the light modulation device 10 shown in FIG. 1, in addition to the direct magnetic field H applied by the permanent magnet, a microwave signal is input to the first transducer 14a via the microwave input terminal 16, thereby generating a high-frequency magnetic field in the YIG bulk single crystal 12. Generally, when an internal magnetic field is created in an optical medium, rotation of the polarization plane of the optical waves propagating through the medium causes magneto-optical effects such as the Faraday effect (an effect created when the progression direction of the light is parallel to the internal magnetic field) and the Cotton-Mouton effect (an effect created when the progression direction of the light is perpendicular to the internal magnetic field). Therefore, in the light modulation device 10 shown in FIG. 1, in addition to the static magneto-optical effect created by the magnetic field H, a static magneto-optical effect created by the high-frequency magnetic field is also superimposed. Furthermore, although only linearly polarized light which has been given a particular direction of polarization by the analyzer 28 reaches the photodetector 30, the dynamic magneto-optical effect described above causes the linear polarization component passing through the analyzer 28 to vibrate at the frequency of the microwave. The photodetector 40 is completely incapable of tracking the frequency of the light, but it can track changes in the light strength (changes in the envelope curve) at the frequency of the microwave. As a result, the optical signal is modulated by the microwave signal.

The YIG single crystal belongs to the cubic crystal group, and is known to have an easy magnetization axis in the <111> direction, and a difficult magnetization axis in a <110> direction. As the <111> direction is parallel to the (110) face, in the light modulation device 10 of FIG. 1, the light propagation direction matches the easy magnetization direction of the YIG bulk single crystal 12. Moreover, the direct magnetic field H is applied in that direction, and consequently the light propagation direction and the internal magnetic field form a Faraday arrangement. Since the Faraday effect is a more considerable phenomenon than the Cotton-Mouton effect, in the structure of the light modulation device 10 shown in FIG. 1, the modulation efficiency of the microwave on the light is greater.

Note that, due to the crystal symmetry of the YIG single crystal, the <111> direction is also parallel to the (211) face in the YIG single crystal. Therefore, with a YIG bulk single crystal plate having a <211> direction, the light propagation direction and the direct magnetic field H can match the easy magnetization direction.

In the light modulation device 10 shown in FIG. 1, a permanent magnet was used as the excitation source for the magnetic field H, but an electromagnet may be used instead. Furthermore, the positions of the polarizer 22 and the first lens 24 may be switched, and the positions of the second lens 26 and the analyzer 28 may be switched. Moreover, the polarizer 22 and the analyzer 28 do not have to be arranged in a crossed Nicols relationship. These possible modifications similarly apply in other light modulation devices and a filter device to be explained later.

Figure 3:
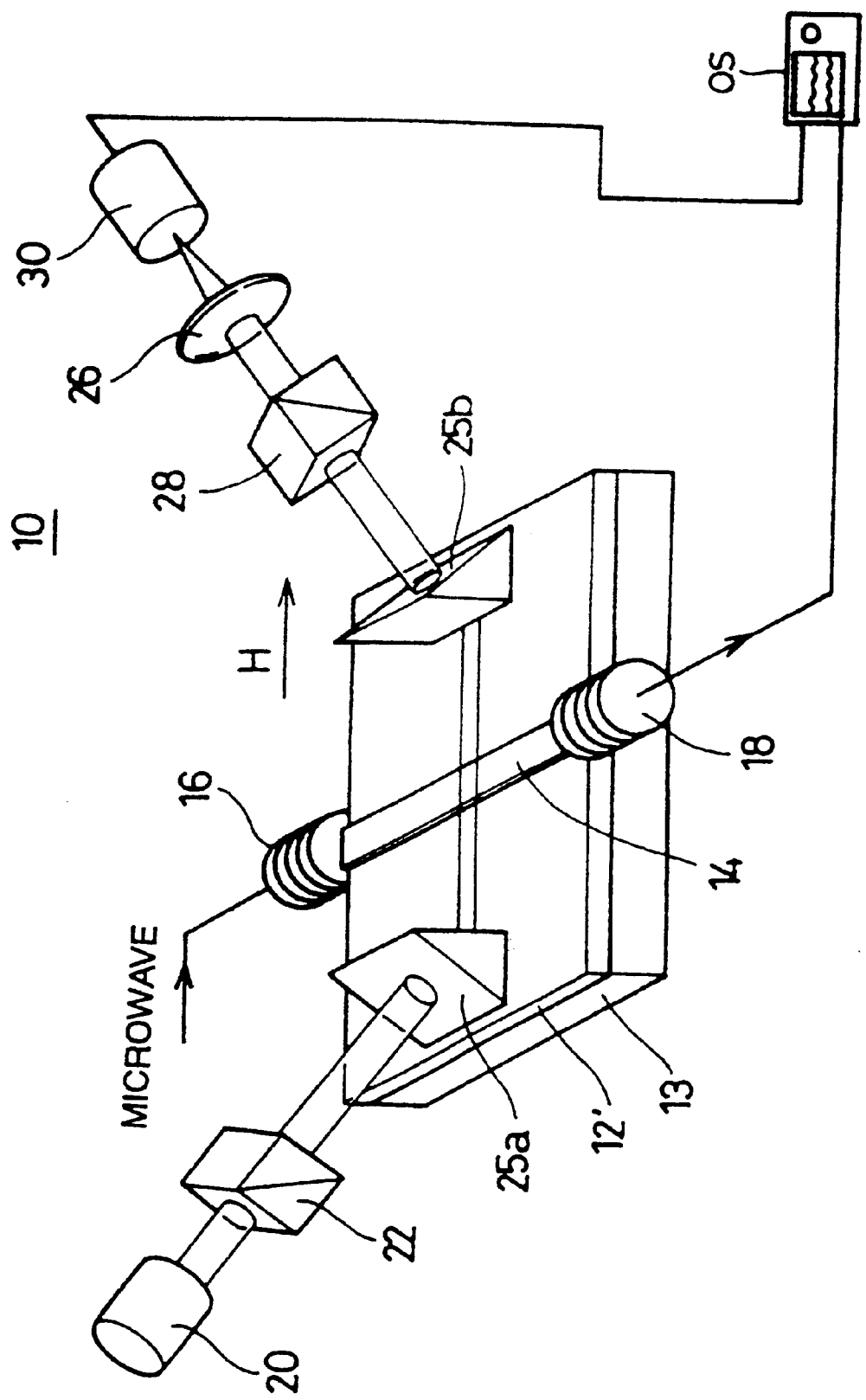
FIG. 3 is a diagrammatic view showing another example of a light modulation device according to this invention.

FIG. 3 is a diagrammatic view of another example of the light modulation device according to the present invention. The light modulation device 10 shown in FIG. 3 uses as its magnetic garnet single crystal an InGa:YIG film 12' (saturation magnetization: 120 mT) which has a thickness of 10 μm and is grown by LPE on a nonmagnetic GGG ($Gd_3Ga_5O_{12}$)<110> substrate 13. When normal LPE growth is carried out, LPE films of approximately equal thickness are grown on both sides of the GGG substrate, but here, the film on one side has been completely removed by polishing, and moreover, the GGG substrate 13 is trimmed until it has a thickness of 300 μm. Then, the GGG substrate 13 is cut to a size of 10 mm×10 mm, and in addition, its end faces are (211) and (111).

A transducer 14 comprises a micro-stripline having for instance a width of 1 mm and a thickness of 0.1 mm, and is provided centered in one direction on the main face of the InGa:YIG film 12'.

Furthermore, a microwave input terminal 16 and a microwave output terminal 18 comprise for instance coaxial connectors, and are provided at both ends in the other direction of the InGa:YIG film 12'. The microwave input terminal 16 and the microwave output terminal 18 are connected respectively to one end and another end of the transducer 14. The microwave input terminal 16 is for being connected to an output terminal of a microwave generator (not shown in the diagram) for generating microwaves in, for instance, the GHz band. The microwave output terminal 18 is connected to an oscilloscope OS in order to measure the output from the microwave output terminal 18.

Moreover, a permanent magnet (not shown in the diagram) is provided near the InGa:YIG film 12'. This permanent magnetic applies a weak direct magnet field H parallel to the YIG bulk single crystal 12, and in addition, perpendicular to the micro-stripline transducer 14.

Furthermore, a first rutile prism 25a and a second rutile prism 25b are provided on the InGa:YIG film 12'. A semiconductor laser 20 and a polarizer 22 are provided so that the laser beam generated by the semiconductor laser 20 passes through the polarizer 22, and is led by the first rutile prism 25a into the InGa:YIG film 12'. Moreover, an analyzer 28, a lens 26, and a photodetector 30 are provided so that the laser beam is extracted into free space from the InGa:YIG film 12' by the second rutile prism 25b, passes through the analyzer 28 and the lens 26, and is detected by the photodetector 30. The output terminal of the photodetector 30 is connected to the oscilloscope OS in order to measure the output of the photodetector 30.

In the light modulation device 10 shown in FIG. 3, a laser beam in a 1.3 μm band is generated by the semiconductor laser 20, linearly polarized in a specific direction by the polarizer 22, and led by the first rutile prism 25a into the InGa:YIG film 12'. In this case, the light of the laser beam proceeds inside the InGa:YIG film 12' in the <111> direction. Furthermore, after the laser beam has been extracted into free space from the InGa:YIG film 12' by the second rutile prism 25b, and has permeated the analyzer 28, it is focused on the photodetector 30 by the second lens 26, and detected by the photodetector 30. The output from the photodetector 30 is measured by the oscilloscope OS.

On the other hand, the GHz band microwave signal is input from the microwave input terminal 16 to one terminal of the transducer 14, and passes to the other end of the transducer 14, and the microwave output is measured from the microwave output terminal 18. This output triggers the oscilloscope OS, while the output of the photodetector 30 is measured by the oscilloscope OS.

In the light modulation device 10 shown in FIG. 3, according to the measurement performed by the oscilloscope OS, a modulation component having the same phase and at the same frequency as the microwave signal applied to the transducer 14 is superimposed on the light detected by the photodetector 30, whereby the light is modulated by the microwave signal. Conceivably, this is due to exactly the same mechanism as that by which light is modulated by the microwave signal in the light modulation device 10 shown in FIG. 1. That is, in the light modulation device 10 shown in FIG. 3, the light propagation direction in the InGa : YIG film 12' matches the easy magnetization direction, thereby producing a Faraday arrangement.

Figure 4:
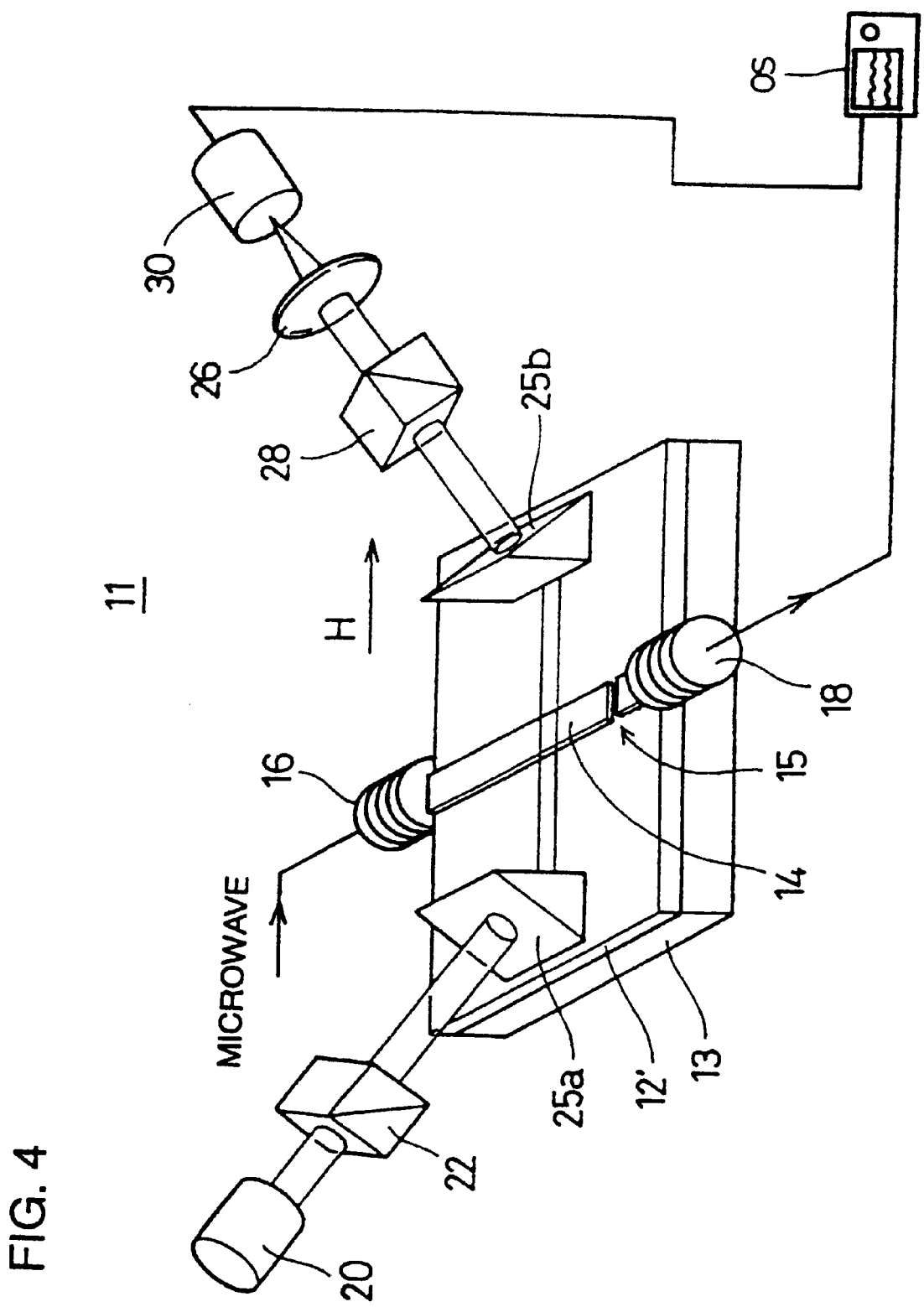
FIG. 4 is a diagrammatic view showing an example of a filter device according to an embodiment of this invention.

FIG. 4 is a diagrammatic view of an example of a filter device according to the present invention. In comparison with the light modulation device 10 shown in FIG. 3, the filter device 11 shown in FIG. 4 has a gap provided in the transducer 14 comprising a micro-stripline, so that the micro-stripline has the structure of a resonator.

Figure 5:
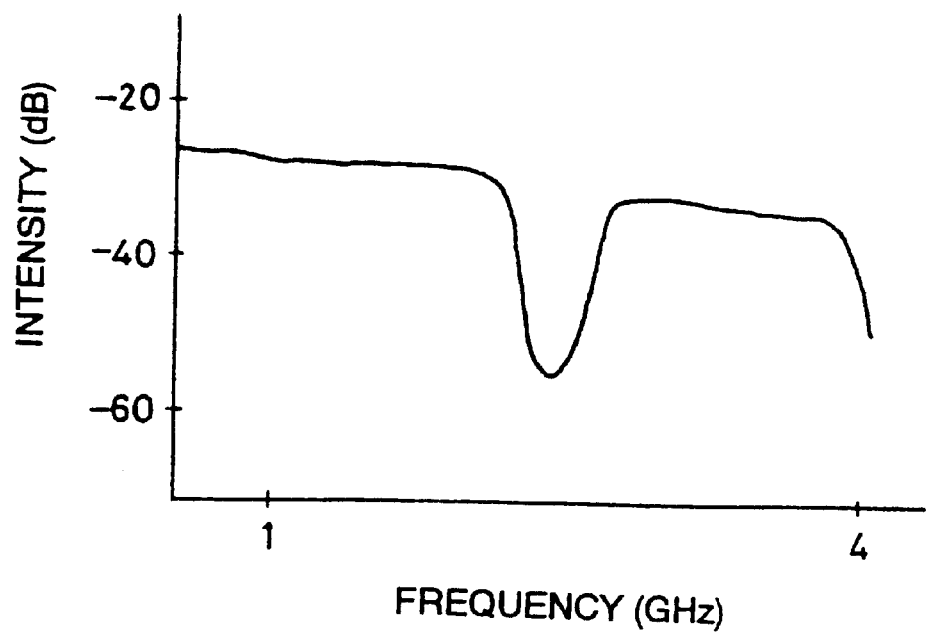
FIG. 5 is a graph showing frequency characteristics of a microwave output in the filter device shown in FIG. 4.
Figure 6:
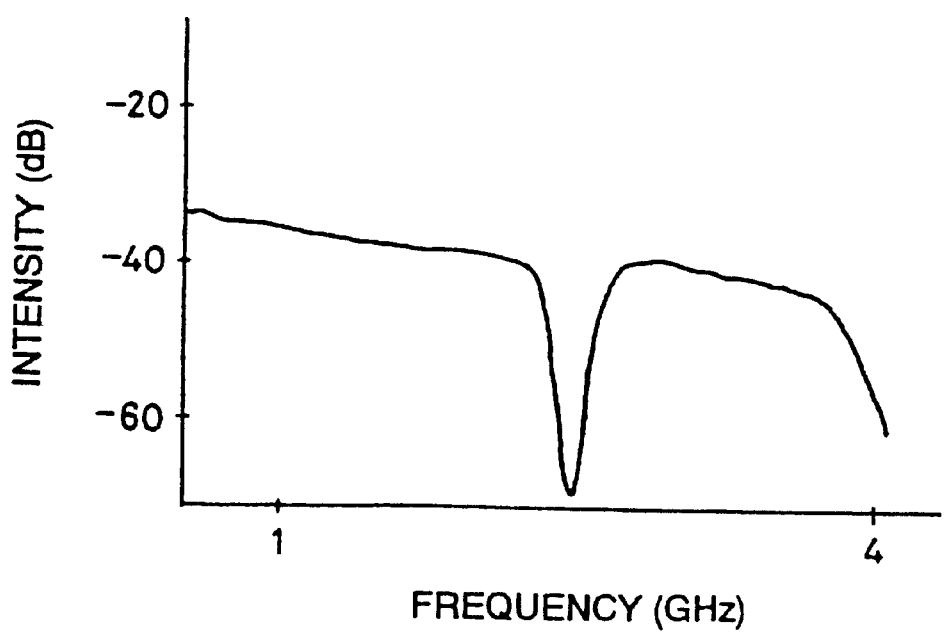
FIG. 6 is a graph showing frequency characteristics of a light output with a modulation component applied thereto by a microwave signal in the filter device shown in FIG. 4.

In the filter device 11 shown in FIG. 4, since a gap is provided in the transducer 14 comprising a micro-stripline, the resonance gives the microwave signal output from the micro-stripline the frequency characteristics (propagation characteristics) shown in FIG. 5. Furthermore, in the filter device 11 shown in FIG. 4, the microwave signal has nonlinearity, which is effective for modulating light, and consequently, the light output has the frequency characteristics of the modulation component applied by the microwave, as shown in FIG. 6. In FIG. 6, the frequency characteristics of the microwave output shown in FIG. 5 are exaggerated. Therefore, the filter device 11 shown in FIG. 4 can be used as a high-Q filter.

While preferred embodiments of the invention have been disclosed, various modes of carrying out the principles disclosed herein are contemplated as being within the scope of the following claims. Therefore, it is understood that the scope of the invention is not to be limited by the disclosed embodiments.

What is claimed is:

1. A light modulation device comprising:

a magnetic garnet single crystal having a main surface and an easy magnetization axis in parallel with the main surface;

an optical source arranged such that light emitted from the optical source is introduced into the magnetic garnet single crystal and propagates in the magnetic garnet single crystal along a first direction on the main surface; and at least one transducer provided at the main surface of the magnetic garnet single crystal for applying a microwave signal in a region of the magnetic garnet single crystal where the light from the optical source propagates, whereby said light is modulated by said microwave signal, wherein the magnetic garnet single crystal has a <110> direction or a <211> direction as the main surface.

2. The light modulation device according to claim 1, wherein the first direction on the main surface of the magnetic garnet crystal and the easy magnetization axis are parallel with each other.

3. The light modulation device according to claim 2, wherein a magnetic field is applied to the magnetic garnet single crystal along the first direction.

4. The light modulation device according to claim 1, wherein the magnetic garnet single crystal is a magnetic garnet single crystal comprising $Y_3Fe_5O_{12}$, or at least one of Y and Fe of the $Y_3Fe_5O_{12}$ being substituted with another element.

5. The light modulation device according to claim 1, further comprising a photodetector disposed for detecting the light propagated in the magnetic garnet single crystal.

6. The light modulation device according to claim 1, wherein said at least one transducer comprises one transducer with a microwave input terminal and a microwave output terminal connected respectively to opposite ends thereof.

7. The light modulation device according to claim 1, wherein said at least one transducer comprises a pair of transducers spaced from each other along said first direction, said pair of transducers having a microwave input terminal and a microwave output terminal connected respectively thereto.

8. A light modulation device comprising:
   a magnetic garnet single crystal having a main surface and an easy magnetization axis in parallel with the main surface;
   an optical source arranged such that light emitted from the optical source is introduced into the magnetic garnet single crystal and propagates in the magnetic garnet single crystal along a first direction on the main surface; and
   at least one transducer provided at the main surface of the magnetic garnet single crystal for applying a microwave signal in a region of the magnetic garnet single crystal where the light from the optical source propagates, whereby said light is modulated by said microwave signal,
   wherein the magnetic garnet single crystal is a bulk single crystal.

9. The light modulation device according to claim 8, wherein the magnetic garnet single crystal has a <110> direction or a <211> direction as the main surface.

10. A light modulation device comprising:
   a magnetic garnet single crystal having a main surface and an easy magnetization axis in parallel with the main surface;
   an optical source arranged such that light emitted from the optical source is introduced into the magnetic garnet single crystal and propagates in the magnetic garnet single crystal along a first direction on the main surface; and
   at least one transducer provided at the main surface of the magnetic garnet single crystal for applying a microwave signal in a region of the magnetic garnet single crystal where the light from the optical source propagates, whereby said light is modulated by said microwave signal,
   wherein the magnetic garnet single crystal is an epitaxial thin-film.

11. The light modulation device according to claim 10, wherein the magnetic garnet single crystal is an epitaxial thin-film made using a liquid phase epitaxial method.

12. The light modulation device according to claim 10, wherein the magnetic garnet single crystal has a <110> direction or a <211> direction as the main surface.

13. A light modulation device comprising:
   a magnetic garnet single crystal having a main surface and an easy magnetization axis in parallel with the main surface;
   an optical source arranged such that light emitted from the optical source is introduced into the magnetic garnet single crystal and propagates in the magnetic garnet single crystal along a first direction on the main surface; and
   at least one transducer provided at the main surface of the magnetic garnet single crystal for applying a microwave signal in a region of the magnetic garnet single crystal where the light from the optical source propagates, whereby said light is modulated by said microwave signal,
   wherein said at least one transducer functions as a resonator in response to said microwave signal.

14. The light modulation device according to claim 13, wherein the magnetic garnet single crystal has a <110> direction or a <211> direction as the main surface.

15. A light modulation device comprising:
   a magnetic garnet single crystal having a main surface and an easy magnetization axis in parallel with the main surface;
   an optical source arranged such that light emitted from the optical source is introduced into the magnetic garnet single crystal and propagates in the magnetic garnet single crystal along a first direction on the main surface; and
   at least one transducer provided at the main surface of the magnetic garnet single crystal for applying a microwave signal in a region of the magnetic garnet single crystal where the light from the optical source propagates, whereby said light is modulated by said microwave signal,
   wherein said at least one transducer comprises a gap, so as to function as a resonator in response to said microwave signal.

16. The light modulation device according to claim 15, wherein the magnetic garnet single crystal has a <110> direction or a <211> direction as the main surface.

* * * * *